United States Patent
Mancini et al.

(10) Patent No.: US 9,273,257 B2
(45) Date of Patent: Mar. 1, 2016

(54) PROCESS FOR CONTINUOUS PRODUCTION OF BIODIESEL FROM FATTY ACID CONTAINING FEEDSTOCKS

(76) Inventors: Tara C. Mancini, Buffalo, NY (US); David Bradley, Buffalo, NY (US)

( * ) Notice: Subject to any disclaimer, the term of this patent is extended or adjusted under 35 U.S.C. 154(b) by 556 days.

(21) Appl. No.: 13/376,310

(22) PCT Filed: Jun. 4, 2010

(86) PCT No.: PCT/US2010/037541
§ 371 (c)(1),
(2), (4) Date: Dec. 5, 2011

(87) PCT Pub. No.: WO2010/141917
PCT Pub. Date: Dec. 9, 2010

(65) Prior Publication Data
US 2012/0073187 A1      Mar. 29, 2012

Related U.S. Application Data

(60) Provisional application No. 61/184,552, filed on Jun. 5, 2009.

(51) Int. Cl.
C10L 1/18       (2006.01)
C10L 1/02       (2006.01)
B01J 31/02      (2006.01)

(52) U.S. Cl.
CPC .............. *C10L 1/026* (2013.01); *B01J 31/0212* (2013.01); *B01J 2531/46* (2013.01); *C10G 2300/1011* (2013.01); *Y02E 50/13* (2013.01); *Y02P 30/20* (2015.11)

(58) Field of Classification Search
CPC ... C10L 1/026; B01J 31/0212; B01J 2531/46; C10G 2300/1011; Y02E 50/13
USPC ................................................... 44/388, 398
See application file for complete search history.

(56) References Cited

U.S. PATENT DOCUMENTS

| | | | | |
|---|---|---|---|---|
| 2,496,328 A | * | 2/1950 | Bell et al. | 554/168 |
| 6,822,105 B1 | * | 11/2004 | Luxem et al. | 554/167 |
| 7,087,771 B2 | * | 8/2006 | Luxem et al. | 554/157 |
| 9,029,583 B2 | * | 5/2015 | Srinivasan | C10L 1/026 554/167 |
| 2007/0261294 A1 | * | 11/2007 | Aiken | 44/307 |

* cited by examiner

*Primary Examiner* — Cephia D Toomer
(74) *Attorney, Agent, or Firm* — Phillips Lytle LLP

(57) ABSTRACT

A method of producing biodiesel comprising the steps of collecting a raw material comprising a fatty acid and an oil; contacting the raw material with glycerol and a Lewis acid catalyst in a first reaction chamber at a selected pressure and temperature; separating water from the mixture product in a gas phase; and contacting the mixture product with a second alcohol and an alkali catalyst in a second reaction chamber to form a product comprising a fatty acid ester.

28 Claims, 6 Drawing Sheets

PROCESS FOR CONTINUOUS PRODUCTION OF BIODIESEL FROM FATTY ACID CONTAINING FEEDSTOCKS

CROSS-REFERENCE TO RELATED APPLICATIONS

This application claims the benefit of U.S. Provisional Patent Application No. 61/184,552 filed on Jun. 5, 2009, and PCT application PCT/US2010/037541 filed on Jun. 4, 2010. The entire content of such applications are incorporated by reference herein.

TECHNICAL FIELD

The present invention relates generally to biodiesel production and, more particularly, to a continuous process for the production of fatty acid alkyl esters (FAMEs) such as fatty acid methyl esters (FAMEs) and fatty acid ethyl esters (FAEEs).

DISCLOSURE OF THE INVENTION

With reference to corresponding parts, portions or surfaces of the disclosed embodiment, merely for the purposes of illustration and not by way of limitation, the present invention provides an improved method of producing biodiesel comprising the steps: (a) collecting a raw material comprising a fatty acid and an oil; (b) contacting the raw material with a first alcohol, preferably glycerol, and a Lewis acid catalyst in a first reaction chamber at a selected pressure and temperature; (c) separating from the mixture product of step (b) water in a gas phase; (d) contacting the mixture product of steps (b) and (c) with a second alcohol and an alkali catalyst in a second reaction chamber to form a mixture product comprising a fatty acid ester. The raw material may be trap grease (brown grease) or yellow grease. The acid catalyst may be a Lewis acid catalyst that facilitates conversion of acid to ester in the presence of an alcohol. The acid catalyst may be a titanate catalyst. The selected pressure and temperature may be at reflux conditions of glycerol. The selected pressure may be between about 10 torr and about 30 torr. The selected temperature may be between about 150° C. and about 200° C. The first reaction chamber may comprise the glycerol in a molar concentration of at least about a 0.75 (weight %) concentration of the fatty acids. The first reaction chamber may comprise a fractionating column. The mixture product of step (b) may comprise a monoglyceride or a diglyceride. The mixture product of step (d) may comprise a fatty acid monoester of an alcohol, such as methanol or ethanol. A reaction by-product of step (d) may be glycerol and the glycerol may be separated through phase separation from the mixture product of step (d). The separated glycerol may be returned to the first reaction chamber. The first reaction chamber may comprise a continuous stirred tank reactor.

Water may be removed from the collected raw material of step (a). The water may be removed by heating the collected raw material of step (a). The mixture product of the first reaction chamber may be fed to an intermediate reaction chamber at a selected pressure and temperature. The temperature of the intermediate reaction chamber may be the same or higher than the selected temperature of the first reaction chamber and the selected pressure of the intermediate reaction chamber may be the same or lower than the pressure of the first reaction chamber, whereby the reaction conditions becoming progressively more intense such that the reaction driving force for water removal is increased. A trace base may be contacted with the raw material of step (a), whereby any strong acids in the raw material are neutralized. The process may be performed such that the first reaction chamber does not contain sulfuric acid, phosphoric acid, or alkyl/aryl sulfonic acids. The water evaporated or in the gas phase may be fed into a catalytic oxidizer, whereby any acrolein in the water in a gas phase may be oxidized.

The Lewis acid catalyst may be maintained in a concentration of about 0.1 to about 1% of the concentration of the fatty acid. The second alcohol may comprise methanol or ethanol. The second reaction chamber may comprise the second alcohol at a concentration of about 50% to about 100% molar excess of the fatty acid. The second reaction chamber may comprise a continuous plug flow reactor.

The mixture product of step (d) may be purified and the step of purifying may comprise evaporation of an excess of the second alcohol from the product of step (d) to form a recovered second alcohol product and a first purified product. The recovered second alcohol product may be recycled as a reactant to the second reaction chamber. Fatty acid methyl esters and glycerol from the first purified product may be heated to form a distillate and an undistilled product. The distillate may be phase separated into a glycerol layer and a biodiesel product layer. The undistilled product may be mixed with an oil that is a raw material for biodiesel/biodiesel product and an acidic solution and phase separated to extract free fatty acids in an organic phase product. The organic phase product may be fed as a reactant to the first reaction chamber. The organic phase product may be used as a boiler fuel to heat a reactant or product.

In another aspect the invention provides a method of esterification comprising the steps of (a) collecting a raw material containing a fatty acid and an oil and (b) contacting the raw material with glycerol and a Lewis acid catalyst in a first reaction chamber at a selected pressure and temperature to form a mixture product comprising a fatty acid ester of glycerol.

In another aspect the invention provides a method of transesterification comprising the steps of (a) providing a material containing a fatty acid ester of glycerol and (b) contacting the material with an alcohol and an alkali catalyst in a reaction chamber to form a mixture product comprising a fatty acid ester, such as a fatty acid alkyl ester.

In another aspect the invention provides a method for extracting a fatty acid alkyl ester from a mixture comprising a fatty acid alkyl ester, a free fatty acid salt, and glycerol comprising the steps of (a) distilling out fatty acid alkyl esters, such as a fatty acid methyl ester, and glycerol from said first purified product to form a distillate and an undistilled product (b) phase separating said distillate into a glycerol layer and a biodiesel product layer and (c) mixing said undistilled product with an oil and acidic solution and performing a phase separation to extract free fatty acids in an organic phase product.

Accordingly, the general object may be to provide a method for a process of producing biodiesel from oil feed stocks which contain free fatty acids or fatty acid salts.

These and other objects and advantages will become apparent from the foregoing and ongoing written specification, the drawings, and the claims.

DESCRIPTION OF PREFERRED EMBODIMENTS

Figure 1:
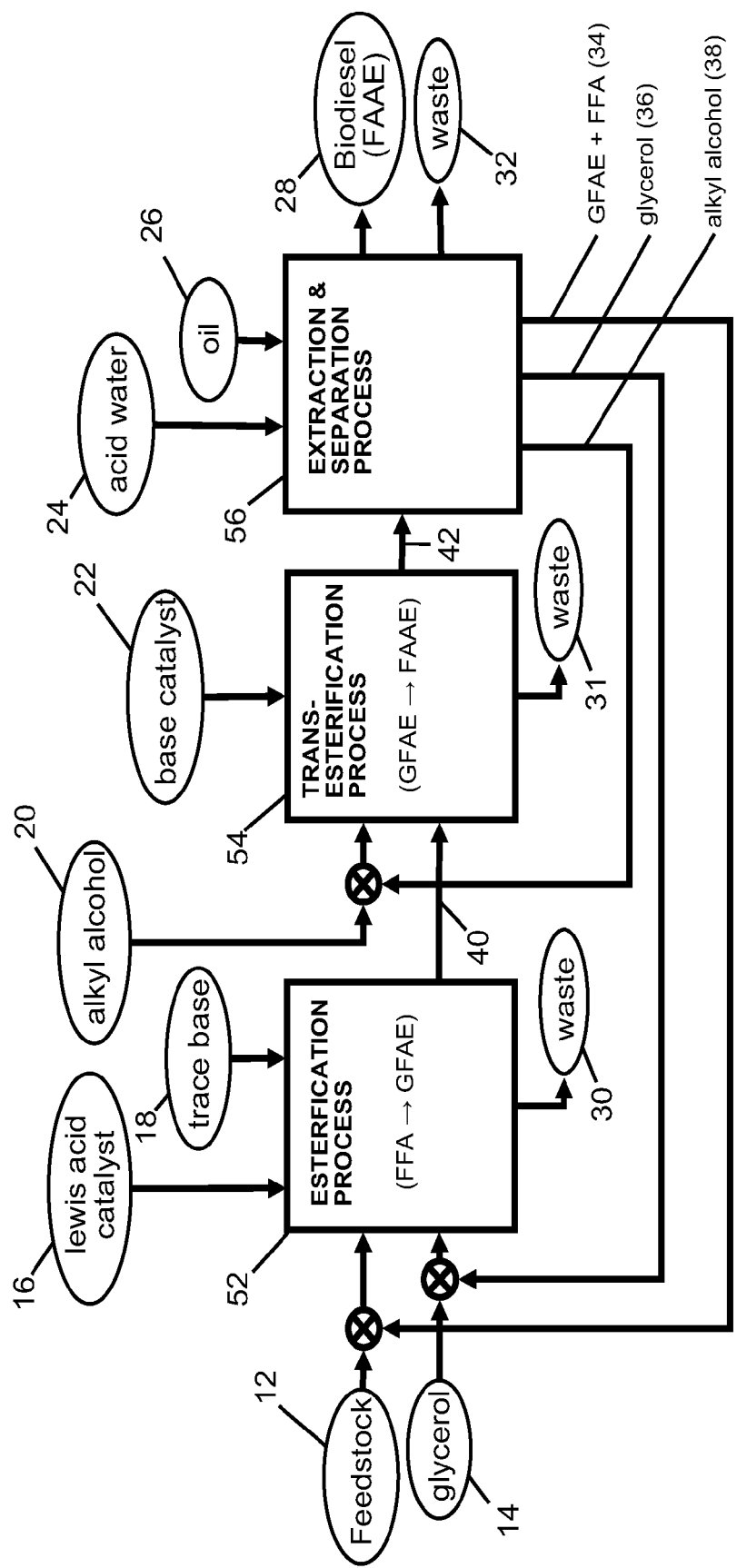
FIG. 1 is a high level flow chart of an embodiment of the entire biodiesel production process.
Figure 2:
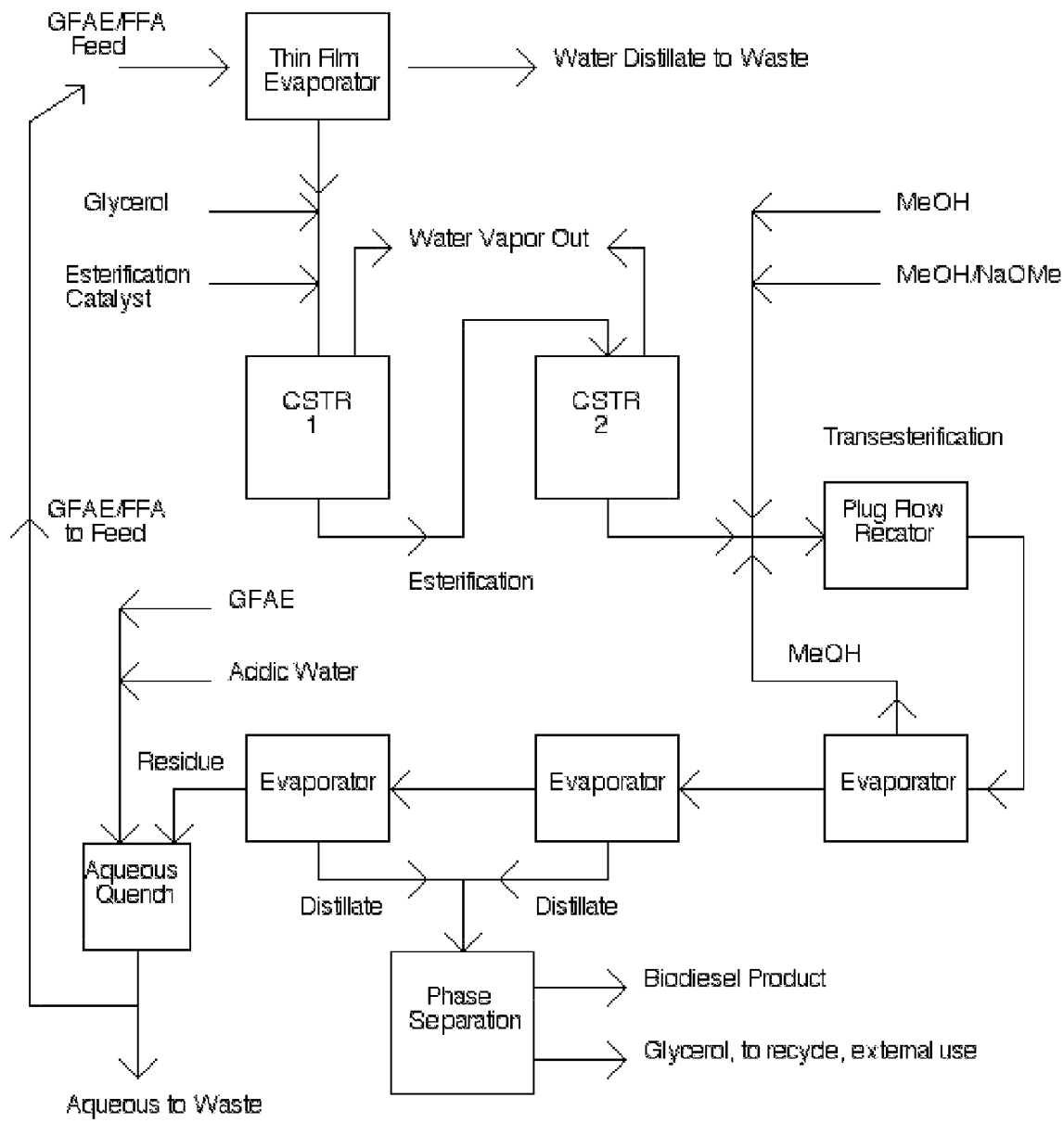
FIG. 2 is a detailed flow chart of the entire biodiesel production process shown in FIG. 1.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

The present invention is directed to the production of fatty acid alkyl esters ("FAAEs"), such as fatty acid methyl esters ("FAMEs"), and fatty acid ethyl esters ("FAEEs"), which can be used as non-toxic diesel fuels (biodiesel), either as the sole constituent or as a mix with fossil fuel derived diesel fuels, and used as transportation or stored energy fuels.

Conventional biodiesels are usually prepared from glycerol fatty acid esters ("GFAEs"), which are usually a triester of glycerol and three fatty acid molecules. These are usually extracted from plants such as seed oils (canola, sunflower), beans (especially soybeans), nuts (peanuts) and grains such as corn. The triesters have very low vapor pressure at normal diesel engine operating conditions, and continued use in internal combustion engines (especially diesels) results in engine damage from carbonization of the triesters in contrast to the desired combustion. However, when these are converted into FAMEs and FAEEs (and/or mixtures of both), vapor pressures are comparable to normal diesel fuels such as hexadecane. The biodiesel materials perform satisfactorily in diesel engines, and are actually superior to regular diesel oil with regards to combustion by products/minimal air pollution as well as engine lubrication.

Premium plant oils such as soybean or corn oil can be quite expensive, and there is competition from food uses for many of these plant oils. Thus, plant oils can become expensive biodiesel raw materials, and the supply of these high quality feedstocks may be limited and costly due to uses other than as a precursor for fuels. There are a large quantity of other sources of glycerol fatty acid esters, sometimes also mixed with free fatty acids ("FFAs"), such as animal fats, and waste plant oils recovered from various food applications, notably fryer grease (used cooking oil) and trap grease. These materials contain some portion of FFAs, resulting from the high temperature hydrolysis caused by cooking foods in these oils. The FFA content ranges from 4 to 20 wt % for fryer grease to well past 50 wt % for trap grease. In many cases, disposing of trap grease costs the generator money, while fryer grease has some value (but less than the original plant oil or lard) as an animal food additive or as a biodiesel precursor.

A high quality GFAE compound such as soybean oil (<0.1 wt % FFA) can be converted into biodiesel by alkaline catalyzed transesterification with the appropriate alkyl alcohol, especially methanol (MeOH) and ethanol (EtOH). These reactions are amenable to continuous production using plug flow reactors that employ good mixing (such as via the use of static mixers). However, these can also be made using batch reaction systems or continuous stirred tank reactors ("CSTRs"), as long as mixing of the alcohol and ester phases is sufficient. Initially the alkyl alcohol, especially methanol along with dissolved base catalyst (typically sodium hydroxide (NaOH), potassium hydroxide (KOH) or sodium methoxide (NaOMe)) is immiscible with the GFAE. At the completion of the reaction, glycerol is immiscible with the FAAE. Due to the density difference, the biodiesel product (lower density) is readily separated from the glycerol (higher density). Also, due to polarity differences, the base catalyst and most of the residual alkyl alcohol (which is often used in excess to drive the reaction to completion) also are dissolved in the glycerol phase. The driving force for the reaction is the greater immiscibility of glycerol in either the GFAE and/or the FAAE. However, in this reaction, if there is any FFA present in the feedstock, the FFA will be neutralized before any reaction will take place to any significant extent. The base is consumed in the process, and sufficient base must be used to react with any FFA prior to the transesterification occurring, since the base transesterification catalyst is consumed by reaction with the FFA. If NaOH or KOH is employed, water is also formed in the neutralizing reaction, which can also participate in a process known as hydrolysis, and which eventually produces FFA in the process. The salts of these FFAs are also known as soaps, and these tend to be able to emulsify the glycerol/alkyl alcohol layer with the GFAE and/or FAAE product. At concentrations above 4 wt % FFA, the high soap concentrations are particularly detrimental to rapid phase separations. The FFA content represents not only a higher usage of base catalyst but also a yield loss of biodiesel.

The FFA content in the feed is reacted into alkyl esters using acidic catalysts (such as sulfuric acid) and the alkyl alcohol, followed by subsequent base catalyzed reactions with more alkyl alcohol in essentially anhydrous reaction conditions. The acidic processes produce water as a by product, and large excesses of alkyl alcohol (which the acid catalyst is soluble in) must be employed. The acid catalysis is much slower than the base catalyst, and higher reaction temperature and/or vast excesses of alkyl alcohol must be employed. In some instances, high pressure conditions (10 or more atmospheres) must be employed due to the required temperatures that are needed. The acid and any formed water must be removed prior to the basic catalyzed second step. The entire transesterification also can be done with acid catalysts, using more extreme conditions high pressures, high temperatures and large excess molar concentrations of the alkyl alcohol. In other cases, various salts or other catalysts may be used at high temperatures and pressures. For example, a catalyst of calcium and barium acetates may be used to convert a mixture of FFA and GFAE into methyl esters at 600 psig (40 atmospheres) and 220° C. In some cases, only high temperatures and/or pressures are required.

Batch reaction systems involving the reaction of glycerol with FFAs may be used as an alternative. These reactions do not require high pressure operation, since glycerol has a low vapor pressure at reaction temperatures of 100 to 240° C. The resulting glycerol capped esters can then be reacted using base catalyzed reactions and can be batch reacted into FAAEs with methyl esters produced.

Converting FFAs into GFAEs can be accomplished by reacting glycerol with FFAs, with or without a catalyst. If possible, employing first order reaction kinetics is important with regards to conversion rates and especially reactor sizing for the esterification system. In theory, the reaction should be a function of the concentrations of the two reactants, glycerol and FFA for a given temperature, pressure, catalyst concentration and reactor configuration. However, employing second order reaction kinetics either increases the reactor size and/or lengthens the reactor residence time unduly. By employing a considerable excess of glycerol, the molar ratios of glycerol to FFA do not remain constant but actually increase significantly as FFA is consumed. The reaction progresses faster with addition of a catalyst.

The alternative to the use of continuous reactors in series is a batch reactor, either sequentially operated or operated to high levels of conversion. For higher order reactions (for example, second order, where the reaction rate is a function of the concentration of the FFA and glycerol, and not just FFA), batch reactors can be the preferred method of achieving high conversion rates of FFAs, even though reactor sizes become quite large in order to achieve high conversions of large quantities of material. An additional problem with batch reactors is the fill time, time to establish reaction conditions and time to discharge the vessel(s). Furthermore, the reaction rate slows considerably in batch reactions, or conversely, longer reaction times are required as conversion levels are increased. For example, in a batch reactor, twice as much time is required to achieve a 96% conversion as is required to attain an 80% conversion and this is a logarithmic relationship.

In Table 1, a comparison of reactor volumes for the same production rate at given conversions is given (See "Chemical Reaction Engineering", Levenspiel, Wiley, 1972). The ratio of a 1st order mixed flow (CSTR) reactor volume to a plug flow reactor volume (which has the same kinetics as a batch reactor) can be calculated using the following equation:

$$Ratio_{m/p} = \frac{\left(\frac{X_A}{1-X_A}\right)}{-\ln((1-X_A))}$$

where $X_A$ is the fraction of reactant A (in this case, FFA) converted into product (FFA converted to a glycerol ester). The conversion where twice the reaction time would be needed at the same reactor production rate as a pair of CSTRs would be a conversion of about 0.22 (78% reaction to glycerol ester).

TABLE 1

CSTR Versus Batch Reactor Volumes for Equivalent Production Rates

| Concentration of $X_A$ | | 1st Order | | 2nd Order | |
| --- | --- | --- | --- | --- | --- |
| 1 Rxn | 2 Rxn | 1 reactor | 2 reactors | 1 reactor | 2 reactors |
| 0.5 | .25 | 1.5 | 3 | 2 | 4 |
| .4 | .16 | 1.75 | 3.5 | 2.6 | 5.2 |
| .3 | .09 | 2 | 4 | 3.3 | 6.6 |
| .2 | .04 | 2.5 | 5 | 5 | 10 |
| .1 | .01 | 4 | 8 | 10 | 20 |
| .05 | .0025 | 6.5 | 13 | 20 | 40 |
| .04 | .0016 | 7.5 | 15 | 25 | 50 |
| .01 | .0001 | 12 | 24 | 100 | 200 |

Thus, to achieve a conversion of 80% ($X_A$=0.2) and an equivalent production rate of glycerol capped ester, a 1st order reaction would require a reactor 2.5 times the volume of a batch vessel (assuming no time loss due to filling, heating, then draining). To achieve a conversion of 96%, where twice the reaction time would be needed, two CSTR vessels operating at 80% can be used, each one 2.5 times the volume of the initial batch reactor. However, the volume of the batch reactor would need to be increased (approximately doubled) to produce material where only 4% of the initially present FFA was still in the mixture, since the reaction time would be doubled as compared to a batch reactor operating at 80% conversion. There are numerous arrangements for CSTRs operated in series (for example, to equalize the water removal rates), but all of these employ steady reaction conditions, and there are no discontinuities to the production process required.

The CSTR is the only continuous system that allows the water produced by the reaction to be removed as it is formed for this process. These reactors are operated under vacuums, at the reflux conditions of glycerol. As can be seen from Table 1, employing conditions where second order reaction conditions apply results in long reaction times or large reactors with long retention times/slow productivity. However, since the presence of excess glycerol at the end of the esterification reaction does not interfere with the alkaline catalyzed transesterification reaction, the advantages of excess glycerol clearly outweigh the recovery and recycle of glycerol.

The choice of the number of CSTR vessels to be used, and the conversion to be achieved in each one, can be varied to suit the FFA content present in the feed. For example, if the FFA content in the feed was less than 8%, only one CSTR might be used, or two of them could be employed at low conversion levels to produce a mix with less than 2% FFA content. In addition, if significant water quantities are present in the feed (which can be an emulsion of oil and water, as with trap grease), an initial water removal step can be utilized prior to adding glycerol and catalyst. The water removal step also has the advantage of preheating the feed.

There are a large number of esterification catalysts which can be employed for the glycerol-FFA reaction, but the preferred one is in low concentrations and compatible with the base catalysts in the transesterification process. Furthermore, catalysts with minimal difficulty in handling, minimal toxicity and minimal disposal costs are preferred. For example, while alkyl tin catalysts are very effective, these are extremely toxic to certain segments of aquatic ecosystems (especially mollusks, shellfish), and also tend to bioaccumulate. Other esterification catalysts, such as antimony acetate, are poisonous, due to the antimony element. The use of strong acids such as sulfuric acid may require the use of glass lined equipment, and are somewhat volatile at the conditions needed to effect viable reaction rates. Strong acids also cause other reactions with glycerol and possibly with the unsaturated portions of FFA molecules/esters. Compounds such as calcium and magnesium acetate can also be used, but these pose problems in the transesterification step, and they react to form insoluble bases and sodium acetate, which is much less effective than catalysts such as sodium methoxide.

One of the preferred catalysts are titanium alkoxides (such as tetrabutyl titanate, or TBT) and titanium chelates, such as lactate. These catalysts pose no problem to the trace base used in the alkaline transesterification step, are inexpensive, have minimal toxicity, are effective in small quantities compared to the FFA content of the feed, and the eventual disposed form of these is paint pigment (titanium dioxide).

Another problem which can occur with glycerol esterification in the presence of strong acids is the formation of acrolein as a by-product. Acrolein (2-propenal) is a toxic and extremely obnoxious smelling volatile material (normal boiling point is 53 C) which also represents a yield loss of glycerol. FFA materials are not strong enough acids to catalyze acrolein formation from glycerol, but sodium hydrogen sulfate, alkyl sulfonic acids, and phosphoric acids can catalyze the glycerol dehydration into acrolein. Such acidic compounds are preferentially neutralized by bases such as sodium hydroxide and magnesium lactate in the presence of FFA's, which are, by comparison, weak acids. The neutralization of strong acids that can be present in trap greases will increase yields/decrease esterification reaction times and minimize the production of the undesired acrolein by-product. Trace quantities of acrolein must be dealt with due to the odor associated with it; catalytic oxidation of the vapor discharge from the vacuum pump(s) used in the esterification step is a known method of treating acrolein vapor discharges.

In Table 2, a list of the boiling points of the methyl esters of fatty acids (saturated) is provided versus temperature for various pressures, along with glycerol. As can be seen, separation of glycerol from the FAMES is difficult via fractional distillation, and the temperatures needed for that are higher than desired due to the pressure increase brought about by the fractionation plates/packing needed to operate a fractional distillation arrangement. Such pressure drops are insignificant in either wiped film evaporators or thin film evaporators.

For most biodiesel compounds, the FFA material is mostly a mix of saturated and unsaturated C18 compounds. Both saturated and unsaturated compounds have very similar boiling points; higher degree of unsaturation tends to lower the freezing point, and has little effect on boiling points. (See "Vapor Pressure and Normal Boiling Point Predictions for Pure Methyl Esters and Biodiesel Fuels", W. Yuan, et. al, Fuel, 2005, 943-950, Table 5.)

The following examples (1-4) show that first order kinetics observed for the glycerol esterification reaction. The reaction rate constants can then be used to estimate continuous reaction CSTR processes.

TABLE 2

FAME and Glycerol Boiling Points at various pressures

| Com- pound | Vapor Pressures (torr) | | | | | | | | |
|---|---|---|---|---|---|---|---|---|---|
| | 0.1 | 0.5 | 1 | 2 | 4 | 6 | 8 | 10 | 20 |
| C8 | | | | 51 | 63 | 69 | 74 | 78 | 91 |
| C10 | | | | 79 | 91 | 98 | 103 | 108 | 122 |
| C12 | | | | 103 | 116 | 124 | 130 | 135 | 151 |
| C14 | | | | 127 | 142 | 150 | 157 | 162 | 179 |
| Glycerol | | | 126 | 138 | 150 | 156 | 163 | 167 | |
| C16 | | | | 149 | 163 | 173 | 179 | 185 | 202 |
| C18 | 116 | 143 | 156 | 169 | 185 | 194 | 199 | | |
| C20 | | | | 188 | | | | | |
| C24 | | | | | 244 | | | | |

FIG. 1 generally shows an embodiment of a new method for the continuous production of fatty acid alkyl esters 28 from oil feedstock 12 containing free fatty acids. Trap grease and fryer grease are two such feed stocks. The method has the main steps of esterification 52, transesterification 54, and extraction & separation 56. Esterification step 52 reacts the free fatty acids within the feedstock with glycerol 14 to form glycerol fatty acid esters. Transesterification step 54 reacts the newly created glycerol fatty acid esters and glycerol fatty acid esters from the original feedstock with methanol 20 to form fatty acid methyl ester (biodiesel) 28. Extraction & separation step 56 recovers unreacted free fatty acid 34, glycerol 36, and methanol 38 to be recycled. Also during extraction & separation step 56, wastes 32 are removed to yield purified fatty acid methyl ester 28.

Figure 3:
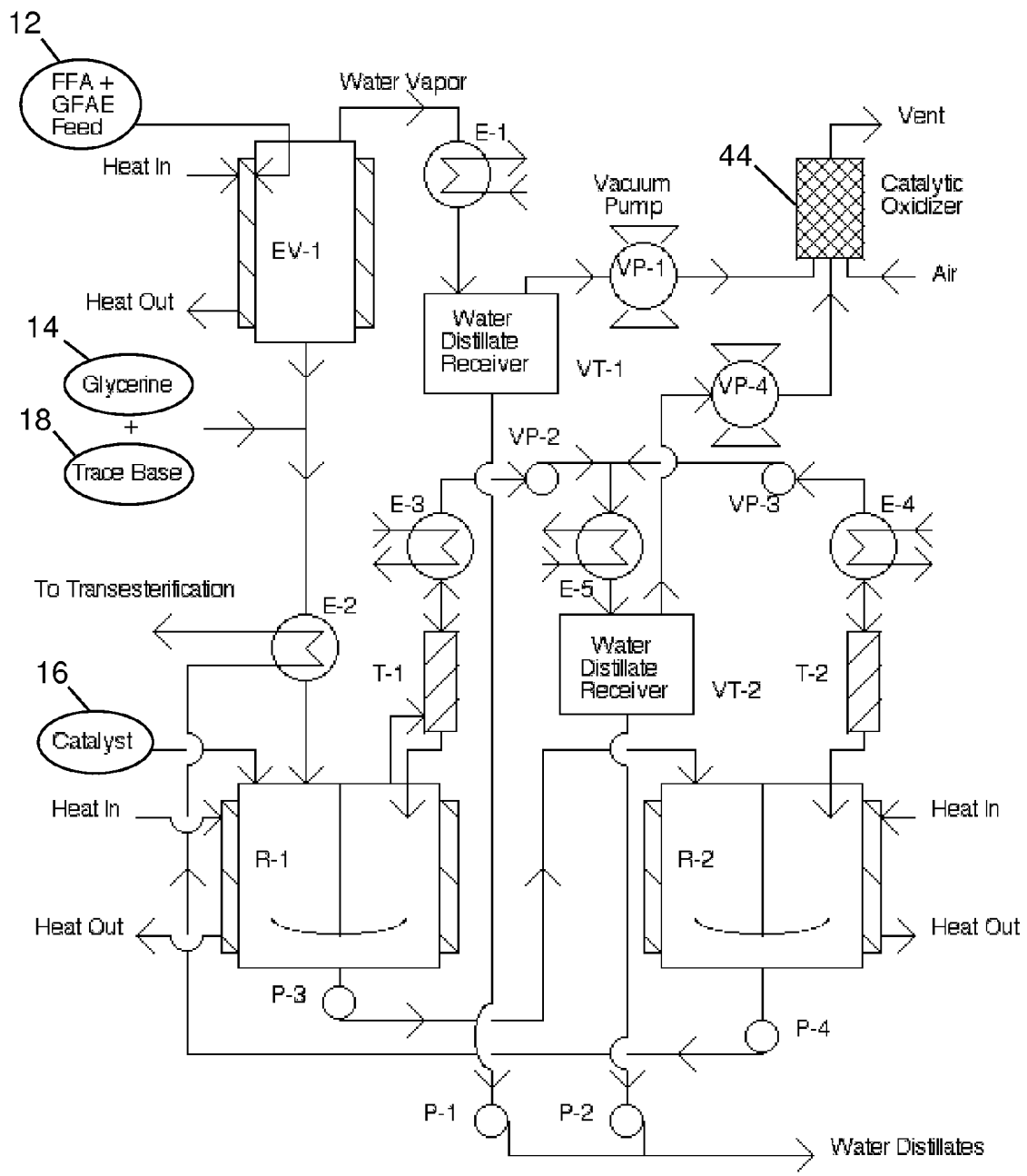
FIG. 3 is a detailed schematic of the esterification process shown in FIG. 1.

The detailed operation of esterification step 52 is shown in FIG. 3. Feedstock 12, consisting of a mix of FFA, water and GFAE, is fed into thin or wiped film evaporator EV-1 where water is stipped out at a temperature near 100° C. and a pressure of about 50 torr. Water is then condensed in condenser E-1 and stored in distillate receiver VT-1. This water distillate may contain trace but noticeable amounts of acrolein. Most of the acrolein does not condense in VT-1 and is vented to catalytic oxidizer 44 via vacuum pump VP-1. The distillate level in VT-1 is maintained by pumping material out of the tank as required by pump P-1. If feedstock 12 contains negligible water, evaporator EV-1 serves as a pre-heater for the subsequent reaction system.

Following the water removal/feedstock pre-heat, glycerol 14 and trace base 18 are added to the dried and heated feedstock. Trace base 18 neutralizes any strong acids present in feedstock 12, which would otherwise catalyze the decomposition of glycerol into acrolein and water though the reaction:

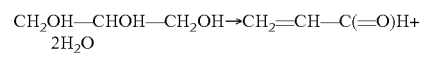

$$CH_2OH\text{---}CHOH\text{---}CH_2OH \rightarrow CH_2=CH\text{---}C(=O)H + 2H_2O$$

The mixture of feedstock, glycerol, and trace base is next heated in heat exchanger E-2 and then passed into Continuously Stirred Tank Reactor ("CSTR") vessel R-1, along with a required quantity of catalyst 16. Catalyst 16 is an organotitanate (ortho-ester or lactate complex), and the rate of addition is based on the FFA content of feedstock 12. The resulting concentration of catalyst 16 in CSTR R-1 should be between about 0.05 to 0.5 wt % Ti (metal basis) to FFA. CSTR R-1 is operated at about 170 to 180° C. and at a reflux point of glycerol and water, a pressure of approximately 10 to 30 Torr. Vapors leaving R-1 pass through small fractionation column T-1 and to partial condenser E-3, which is maintained at about 40 to 80° C. Glycerol enriched vapors are condensed and returned to R-1 via the drain of column T-1. Uncondensed water and any other volatiles, such as acrolein, exit partial condenser E-3, are compressed in vacuum booster pump VP-2, and are passed through condenser E-5. Water vapor is condensed in condenser E-5 and collected in receiver VT-2. Vacuum distillate receiver VT-2 is kept at a pressure of about 50 to 100 Torr, which is maintained by vacuum pump VP-4.

Vapors are vented from receiver VT-2 by vacuum pump VP-4 and fed into catalytic oxidizer unit 44. The liquid level within receiver VT-2 is kept constant by pumping liquid out via pump P-2. Material is pumped from R-1 into next CSTR R-2 via pump P-3 at a rate such that R-1 maintains a constant liquid volume/mass within it. Conditions suitable to allow glycerol to reflux are also maintained in reactor R-2. These conditions in R2 are similar to the conditions in R1, but may consist of a higher temperature, lower pressure, and/or longer residence time. The vacuum in R-2 is maintained by vacuum booster pump VP-3 which discharges to distillate receiver VT-2 via condenser E-5. The mass/liquid volume in R-2 is kept constant by pump P-4. Additional CSTR reactors should be added in series following R-2 as required to attain reaction rates/conversions/throughputs needed to operate the process successfully. Material from the last esterification reactor in the series is cooled through heat exchanger E-2, where it also preheats the material entering reactor R-1.

The evolution of acrolein from the CSTR reactors is a function of the temperature, residence time, and presence of strongly acidic materials in the feeds which can catalyze the dehydration of glycerol into acrolein. Some feed stocks may also contain acrolein and other bacterial decomposition products of glycerol and/or glycerol esters such as in trap grease. Proper management of this by-product is accomplished by the use of the twin vacuum system of vacuum boosters VP-2 and VP-3 and vacuum pumps VP-1 and VP-4, where the discharge from the vacuum pumps is vented to catalytic oxidizer unit 44.

Figure 4:
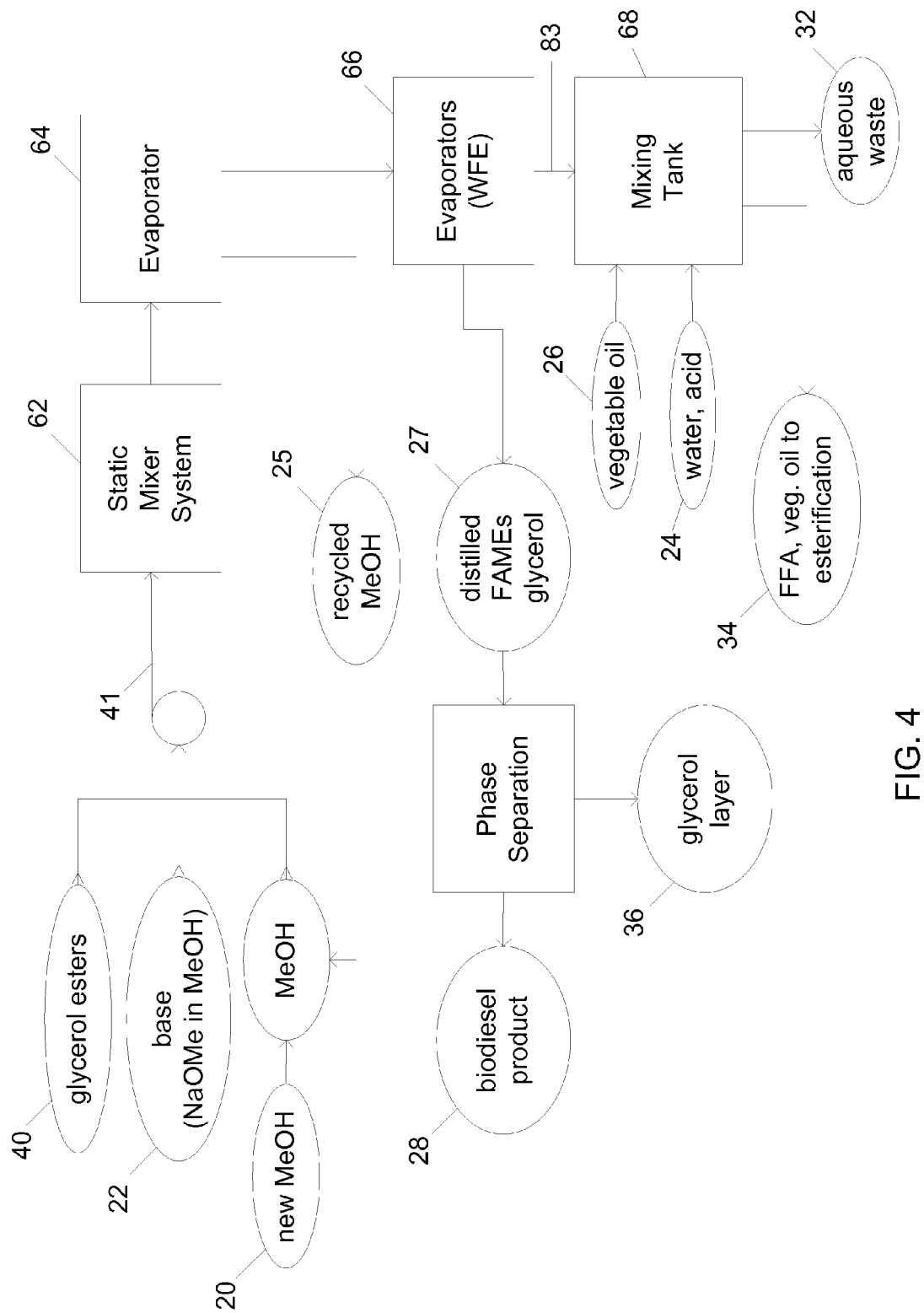
FIG. 4 is a detailed schematic of the transesterification and purification process shown in FIG. 1.
Figure 5:
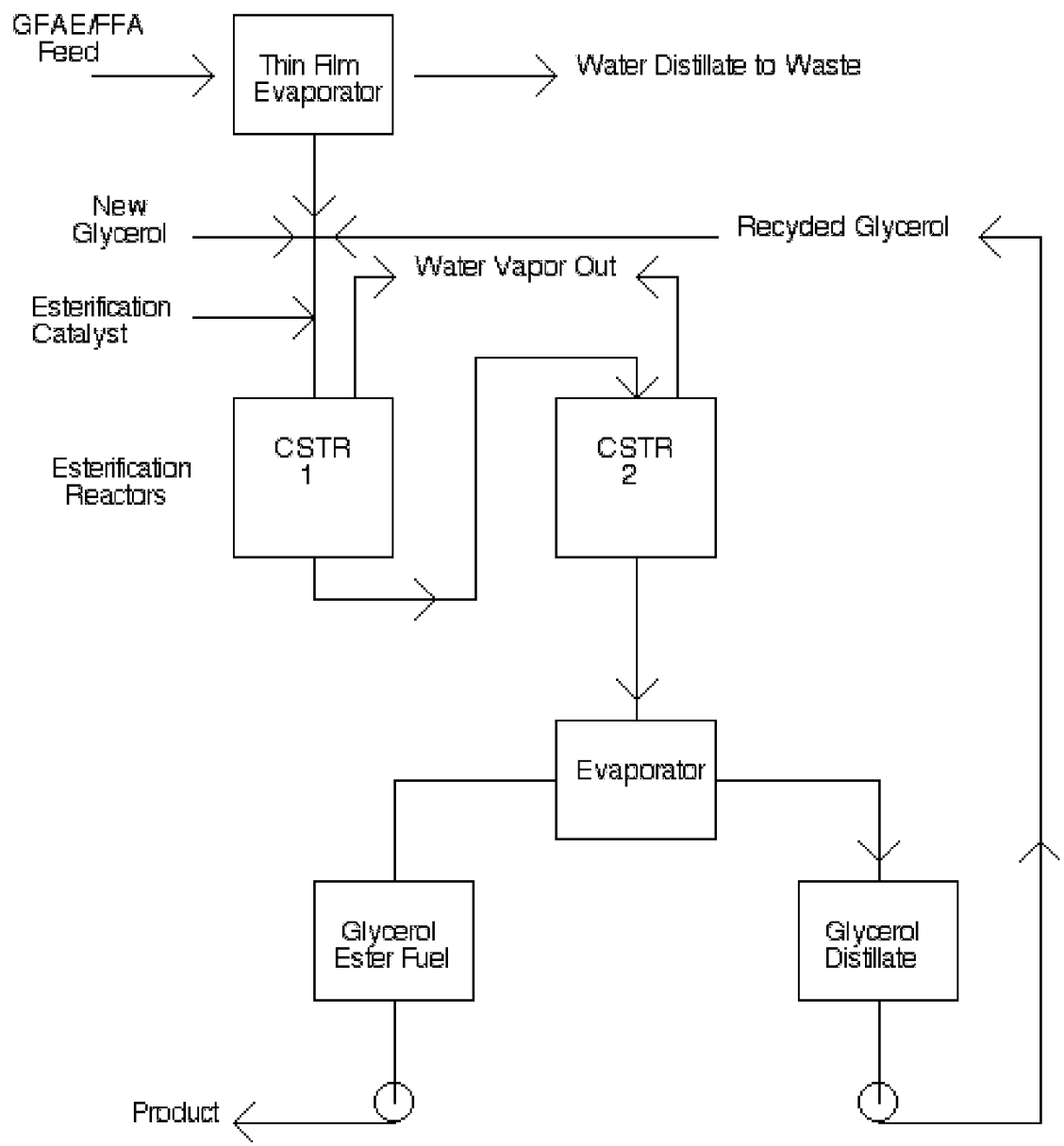
FIG. 5 is flow chart of a modified process for the production of non-compression engine fuels.

Referring next to FIG. 4, transesterification step 54 and extraction and separation step 56 in detail. Material 40 entering the transesterification step must have been cooled to less than about 100° C. Pure methanol (20) and methanol solution mixed with base catalyst (22) sodium methoxide are added to material 40 which creates a reaction mixture 41 at a temperature between about 60 to 80° C. Reaction mixture 41 is a two phase mixture of an aqueous layer of methanol with base and an organic layer with glycerol capped esters. Mixture 41 is then pumped into continuous plug flow reactor ("PFR") 62 which contains static mixers or other high shear devices. A base catalyzed transesterification reaction occurs at an extremely fast rate. The base concentration is kept at about 0.1 to 1 wt % of the glycerol capped esters beyond any acid neutralization by this base. The methanol concentration is initially added to form a 50 to 100 wt % molar excess.

Exiting PFR 62, the reaction mixture contains FAME compounds, trace soaps, methanol, glycerol, as well as the esterification catalyst. Most of the methanol, soaps, and base are dissolved in the glycerol layer, with small amounts of these dissolved in the lower density FAME layer. This mixture is easily emulsified due to the trace soap quantities, which can dissolve in either the FAME or glycerol layer. While emulsion formation is minimized by low resulting concentrations of FFA and soaps at the conclusion of the transesterification reaction, distillation of FAME and excess glycerol removes the problem of emulsification completely. Distillation of FAME also eliminates the need for extra steps to remove trace dissolved solid and ionic compounds, steps which would add extra cost and result in a diminished yield. For example, ionic impurity removal can be accomplished with ion exchange resins which must be replenished and/or discarded when spent.

The mixture leaving PFR 62 is pumped to evaporator 64 (thin film or wiped film) operated at about 25 to 50 Torr and 100° C. and with a liquid residence time of less than 15 seconds. Methanol 25 removed by evaporator 64 is condensed at about −5 to 5° C., and is recycled to mix with methanol 20 being fed into transesterification step 54. Liquid material 81 leaving evaporator 64 will contain a mole fraction of methanol of less than 0.02. Material 81 is then fed to a series of thin and/or wiped film evaporators 66, where the glycerol and FAME material 27 are co-distilled. The boiling point of glycerol is quite similar to many of the FAME compounds (see Table 2), especially those in the C12 to C16 molecular range. If more than one evaporator is employed, additional evaporators should be added in series such that they are fed with undistilled materials from the previous evaporator. The subsequent evaporators will become more concentrated in the higher molecular weight compounds, (C16, C18, C20 and C22) and less concentrated in glycerol. Distillates 27 from each of the evaporators are combined. Operating conditions within evaporators 66 vary from about 1 to 10 Torr and about 125 to 150° C. in the initial high vacuum units, and about 0.1 to 2 Torr and about 150 to 200° C. in subsequent evaporators. The subsequent evaporation units will remove any trace amounts of methanol that were not recovered by the initial evaporator, yielding methanol mole fractions between about 0.02 and 0.005. The heat to the initial high vacuum evaporator can be supplied by the condensation of the crude product from the subsequent (higher vacuum) evaporators, thus lowering energy requirements for this process. The evaporator heating also can be provided from a common heat source such as a boiler and cooling obtained from a cooling system. This system will entail more energy use but will be operationally flexible in accommodating feedstocks of varying compositions.

The glycerol and high boiling fractions 27 from evaporators 66 are phase separated 69 at a temperature of about 40 to 60° C. Phase separation is very rapid. The lower glycerol layer 36 has a density near 1.26 g/ml, while the FAME layer 28 has a density near 0.88 g/ml. Phase separated FAME 28 has essentially no water content, no dissolved solids, and no inorganic content, and therefore requires no further processing for use as a fuel.

The residue 83 from evaporators 66 will be concentrated in soaps, residual alkali and higher boiling/higher molecular weight methyl esters. Residue 83 is pumped into a mixing tank 68 with acidic water solution 24 (preferably containing phosphoric acid or sodium dihydrogen phosphate, NaH2PO4, or sodium hydrogen sulfate, NaHSO4), which neutralizes the bases and soaps. This neutralizing can be done continuously or in a batch fashion; the preferred pH is about 4 at the end of a batch addition or maintained at 4 for a continuous addition. Water solution 24 should be maintained at 40 to 60° C. A solvent 26 such as soybean oil is added to mixing tank 68 to extract any organics that are in residue 83 (such as C18, C20 and C24 methyl esters, and FFAs). The contents of mixing tank 68 are separated by phase into organic layer 34 and waste aqueous layer 32. Organic layer 34 is then recycled back to the initial esterification reactor (FIG. 1, 34). Aqueous layer 32 will consist of an emulsion of titanium dioxide (solid) and sodium salts (such as sodium phosphates or sodium sulfates), and needs to be properly disposed. Organic layer 34 can also be used as boiler fuel should it become overly concentrated in C20 and higher molecular weight compounds.

Testing of the preferred embodiment was performed and several examples of the results are provided below.

EXAMPLE 1

Figure 6:
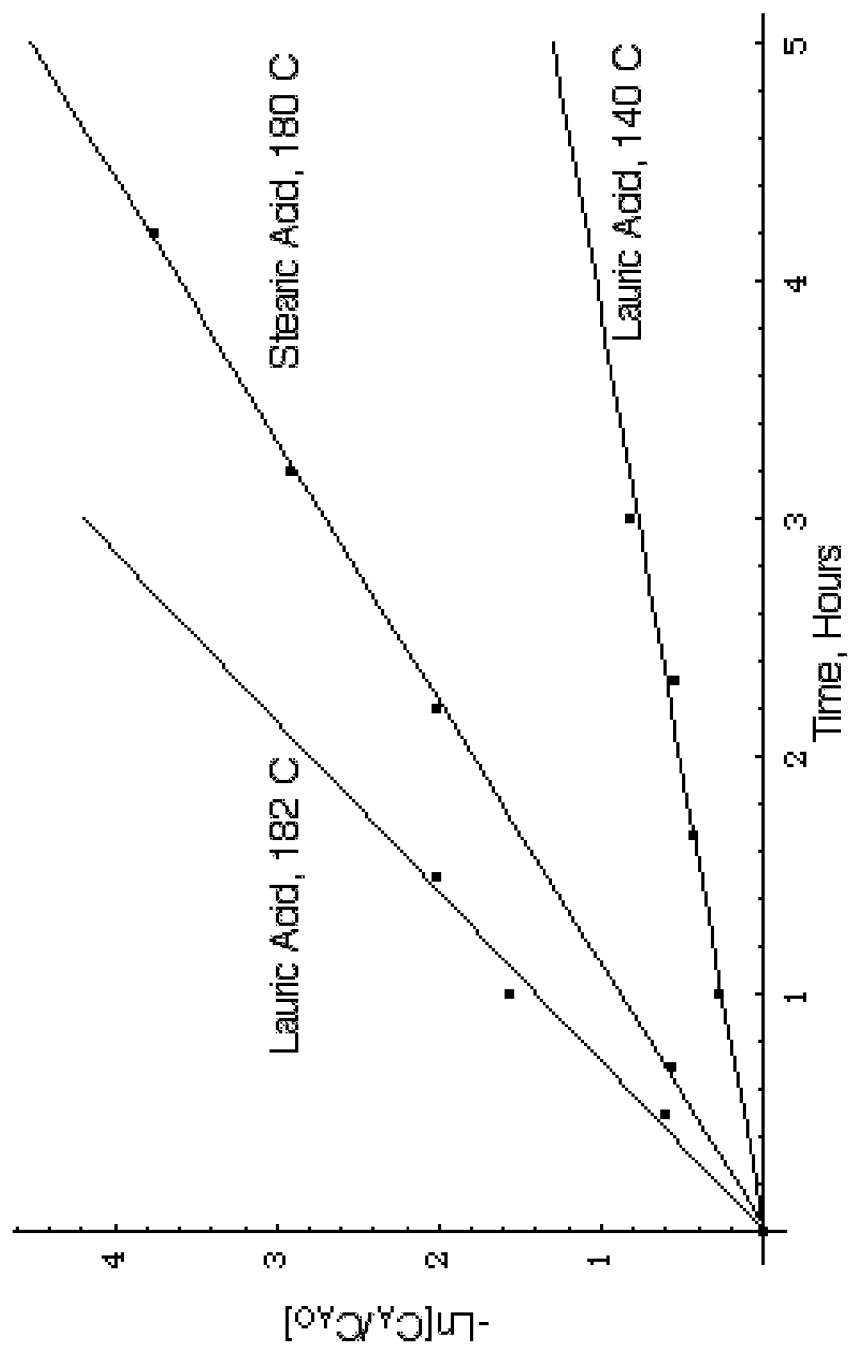
FIG. 6 is a graphical display of the pseudo-first order kinetics of the esterification reaction shown in FIG. 1.

In this experiment, the esterification process was performed to determine the reaction rate using pure compounds. Into a 500 ml RB flask was added 200 g (1 mole) of lauric acid ($C_{12}H_{24}O_2$), and 69 g (0.75 mole) of glycerol, which is 1.5 equivalents of primary hydroxyl per mole of acid. Next, 2.72 g of tetrabutyl titanate (TBT) catalyst (1 wt % of reaction mass) was added and the mixture was heated under vacuum at 2 to 15 Torr. The reaction was done in 2 parts, once averaging 140° C. and once at 182° C. The data was evaluated by plotting the negative logarithm of the reaction conversion (concentration of acid at sample time divided by concentration of acid initially present). The data fit first order kinetics as shown in FIG. 6 (curve is linear). The rate coefficient was 0.26 $hr^{-1}$ at 140° C. and 1.40 $hr^{-1}$ at 182° C. Conversion to 95% occurred in the last step.

EXAMPLE 2

The esterification process was repeated at one temperature with stearic acid ($C_{18}H_{35}O_2$). 284 g (1 mole) of the acid, 69 g of glycerol, and 2.85 g of TBT were added and reacted at 180° C. The reaction rate was first order (linear) over the time monitored, and found to have a reaction rate constant of 0.91 $hr^{-1}$. Conversion to 97.6% occurred in 4 hours.

EXAMPLE 3

The process was performed using trap grease samples which had high acid contents (~80 wt % acid). First order reaction rates were observed for these materials with up to 98% conversion obtained in 3 hours. These show that a wide variety of materials can be converted in this process. Reaction rates of 1.4 $hr^{-1}$ and 0.94 $hr^{-1}$ were observed at 175° C. Conversions to 98% and 96% were observed in 3 and 3.5 hours, respectively.

EXAMPLE 4

The transesterification process was performed in this example. A 500 ml flask of the glycerated esters of stearic acid (also referred to as stearins, or mono and di-stearoyl esters of glycerine) was heated to 90° C. A solution of 1.875 grams sodium hydroxide pellets (85% NaOH) and 48.8 grams of methanol (1.525 moles) was added over 10 minutes. The mixture was then poured into a container and allowed to cool. The mixture separated into 2 layers, a small amount of glycerol (lower) and a clear upper layer that solidified below 40° C. A white precipitate of titanium dioxide was seen at the interface of the upper and lower layer when a mixed glycerine/methyl ester sample was added to hexane. This demonstrated that the TBT esterification catalyst did not interfere with the NaOH transesterification catalyst.

The reaction rates of the pure compounds are shown in FIG. 6. According to references, a 1st order reaction rate is indicated when the plot of the logarithm of conversion is plotted versus time is linear, all other conditions being constant (such as vacuum and temperature).

While the above embodiments have been described in relation to the continuous production of biodiesel from mixtures of oil and fatty acid, it is contemplated subcomponents of the system may be used independently.

The present invention contemplates that many changes and modifications may be made. Therefore, while the presently-preferred form of the improved method has been shown and described, and a number of alternatives discussed, persons skilled in this art will readily appreciate that various additional changes and modifications may be made without departing from the spirit of the invention, as defined and differentiated by the claims.

What is claimed is:

1. A method of continuously producing biodiesel comprising:
   (a) collecting a raw material, wherein said raw material comprises a mixture of fatty acids and oils;
   (b) contacting said raw material with glycerol and a Lewis acid catalyst in a first reaction chamber of a Continuously Stirred Tank Reactor System (CSTR System) at a selected pressure and temperature, wherein said contacting occurs in the absence of any added sulfuric acid, phosphoric acid, or alkyl/aryl sulfonic acids;
   (c) separating from the mixture product of step (b) water in a gas phase;
   (d) neutralizing the separated product of step (c) with a trace base; and
   (e) contacting the mixture product of steps (b), (c) and (d) with a second alcohol and an alkali catalyst in a second reaction chamber of said CSTR System to form said biodiesel comprising a fatty acid ester in about from 3 hours to about 4 hours, wherein the fatty acid ester conversion rate is at least about 95%.

2. The method of claim 1, wherein said raw material is selected from the group consisting of trap grease, waste plant oils, animal fats, and fryer grease.

3. The method of claim 1, wherein said Lewis acid catalyst is a titanium alkoxide or a titanium chelate catalyst.

4. The method of claim 1, wherein said selected pressure and temperature are at reflux conditions of said glycerol.

5. The method of claim 1, wherein said selected pressure is between about 10 torr and about 30 torr.

6. The method of claim 1, wherein said selected temperature is between about 150° C. and about 200° C.

7. The method of claim 1, wherein said first reaction chamber of said CSTR System comprises said glycerol in a molar concentration of at least about 0.75M glycerol to 1M of said fatty acids.

8. The method of claim 1, wherein said first reaction chamber of said CSTR System comprises a fractionating column.

9. The method of claim 1, wherein said mixture product of step (b) comprises a fatty acid glyceride selected from the group consisting of monoglyceride and diglyceride.

10. The method of claim 9, wherein said mixture product of step (e) comprises a by-product and a fatty acid monoester of methanol or ethanol.

11. The method of claim 10, wherein said fatty acid monoester comprises methanol or ethanol.

12. The method of claim 10, wherein said by-product of step (e) comprises glycerol.

13. The method of claim 12 further comprising separating from said mixture product of step (e) said glycerol through phase separation.

14. The method of claim 13 further comprising returning said separated glycerol phase to said first reaction chamber of said CSTR System.

15. The method of claim 1 further comprising removing water from said collected raw material of step (a), prior to step (b).

16. The method of claim 15, wherein said water is removed by heating said collected raw material of step (a).

17. The method of claim 1, further comprising feeding the mixture product in said first reaction chamber of said CSTR System to an intermediate reaction chamber at a selected pressure and temperature prior to step (c).

18. The method of claim 17, wherein said temperature of said intermediate reaction chamber is the same or higher than said selected temperature of said first reaction chamber of said CSTR System, and wherein said selected pressure of said intermediate reaction chamber is the same or lower than said pressure of said first reaction chamber of said CSTR System.

19. The method of claim 1, wherein said trace base is selected from the group consisting of sodium hydroxide and magnesium lactate.

20. The method of claim 1 further comprising feeding said water in a gas phase into a catalytic oxidizer, wherein any acrolein in said water is oxidized.

21. The method of claim 1, wherein said Lewis acid catalyst is maintained at a concentration from 0.1% to about 1% of said fatty acid concentration.

22. The method of claim 1, wherein said second alcohol is selected from the group consisting of methanol and ethanol.

23. The method of claim 1, wherein said second reaction chamber of said CSTR System comprises said second alcohol at a concentration of about 50% to about 100% molar excess of said fatty acid ester.

24. The method of claim 1, wherein said second reaction chamber of said CSTR System comprises a continuous plug flow reactor.

25. The method of claim 1 further comprising:
(f) evaporating an excess of said second alcohol from the product of step (e) to form a recovered second alcohol product and a first purified product; and
(g) distilling out fatty acid methyl esters and glycerol from said first purified product to form a distillate and an undistilled product.

26. The method of claim 25 further comprising phase separating said distillate into a glycerol layer and a biodiesel product layer.

27. The method of claim 26 further comprising mixing said undistilled product with an oil and acidic solution and performing a phase separation to extract free fatty acids in an organic phase product.

28. The method of claim 27 further comprising feeding said organic phase product as a reactant in said first reaction chamber of said CSTR System.

* * * * *